(12) United States Patent
Haynes et al.

(10) Patent No.: US 12,168,185 B2
(45) Date of Patent: Dec. 17, 2024

(54) SYSTEMS AND METHODS FOR CONTROLLING A RIDE VEHICLE OF AN ATTRACTION SYSTEM

(71) Applicant: Universal City Studios LLC, Universal City, CA (US)

(72) Inventors: Grace Catheryn Haynes, Orlando, FL (US); Michelle Smith, Orlando, FL (US); John David Smith, Orlando, FL (US); Neil Andrew Leiba, Orlando, FL (US); Doug Joseph, Longwood, FL (US)

(73) Assignee: Universal City Studios LLC, Universal City, CA (US)

( * ) Notice: Subject to any disclaimer, the term of this patent is extended or adjusted under 35 U.S.C. 154(b) by 347 days.

(21) Appl. No.: 17/591,324

(22) Filed: Feb. 2, 2022

(65) Prior Publication Data

US 2023/0226458 A1 Jul. 20, 2023

Related U.S. Application Data

(60) Provisional application No. 63/300,209, filed on Jan. 17, 2022.

(51) Int. Cl.
*A63G 31/02* (2006.01)
*A63G 31/16* (2006.01)
*G05D 1/00* (2006.01)
*A63G 7/00* (2006.01)

(52) U.S. Cl.
CPC .......... *A63G 31/02* (2013.01); *A63G 31/16* (2013.01); *G05D 1/0891* (2013.01); *A63G 7/00* (2013.01)

(58) Field of Classification Search
CPC ....... A63G 31/02; A63G 31/16; G05D 1/0891
USPC ........................ 472/43, 59, 60, 61
See application file for complete search history.

(56) References Cited

U.S. PATENT DOCUMENTS

| | | |
|---|---|---|
| 4,420,808 A | 12/1983 | Diamond et al. |
| 5,228,348 A | 7/1993 | Frigiere |
| 10,525,364 B2 | 1/2020 | Bluhm |
| 2016/0303484 A1 | 10/2016 | Masutti |
| 2021/0052989 A1 | 2/2021 | Blum et al. |
| 2021/0138965 A1 | 5/2021 | Ugrin et al. |
| 2022/0062075 A1* | 3/2022 | Bleakney ............... B60L 15/20 |
| 2022/0177069 A1* | 6/2022 | Sharad .................... B62J 27/00 |

OTHER PUBLICATIONS

Brad E. Dicianno, MD, et al, "Joystick use for virtual power wheelchair driving in individuals with tremor: Pilot study," Journal of Rehabilitation Research & Development, Feb. 22, 2008, pp. 269-276, vol. 46, No. 2.

(Continued)

*Primary Examiner* — Kien T Nguyen
(74) *Attorney, Agent, or Firm* — Fletcher Yoder, P.C.

(57) ABSTRACT

An amusement park attraction system including a ride vehicle comprising an input device, and a control system configured to determine a parameter value associated with a force imparted on the input device. The parameter value includes a value of the force imparted on the input device, a value of a deformation caused by the force imparted on the input device, or both. The control system is also configured to control movement of the ride vehicle of the amusement park attraction system based on the parameter value.

20 Claims, 3 Drawing Sheets

(56) References Cited

OTHER PUBLICATIONS

Jann Mayer, et al, "Evaluation of Two Unique Side Stick Controllers in a Fixed-Base Flight Simulator," NASA Dryden Flight Research Center, Dec. 2003, 56 Pages, NASA/TM-2003-212042, Edwards, California.
Ben Kuchera, "$400 gets you the best flight stick you can't move," ars Technica, Jan. 9, 2010, 5 Pages.
PCT/US2023/010793 International Search Report and Written Opinion mailed May 10, 2023.

* cited by examiner

SYSTEMS AND METHODS FOR CONTROLLING A RIDE VEHICLE OF AN ATTRACTION SYSTEM

CROSS REFERENCE TO RELATED APPLICATIONS

This application claims priority to and the benefit of U.S. Provisional Application No. 63/300,209, entitled "SYSTEMS AND METHODS FOR CONTROLLING A RIDE VEHICLE OF AN ATTRACTION SYSTEM," filed Jan. 17, 2022, which is hereby incorporated by reference in its entirety for all purposes.

BACKGROUND

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Amusement parks or theme parks include various features to provide entertainment for guests. For example, the amusement park may include different attraction systems, such as a roller coaster, a motion simulator, a drop tower, a performance show, a log flume, and so forth. In certain embodiments, an attraction system may include a vehicle in which a guest of the attraction system may be positioned. The vehicle may move to impart movement sensations onto the guest and provide a desirable experience to the guest. It is presently recognized that there is a desire to enable the movement of the vehicle to be user-controllable. For example, it may be desirable to enable the guest to control movement of the vehicle and provide a more customizable or interactive experience via the attraction system.

SUMMARY

Certain embodiments commensurate in scope with the originally claimed subject matter are summarized below. These embodiments are not intended to limit the scope of the claimed subject matter, but rather these embodiments are intended only to provide a brief summary of possible forms of the subject matter. Indeed, the subject matter may encompass a variety of forms that may be similar to or different from the embodiments set forth below.

In an embodiment, an amusement park attraction system includes a ride vehicle having an input device and a control system configured to determine a parameter value associated with a force imparted on the input device. The parameter value includes a value of the force imparted on the input device, a value of a deformation caused by the force imparted on the input device, or both. The control system is also configured to control movement of the ride vehicle of the amusement park attraction system based on the parameter value.

In an embodiment, a non-transitory computer-readable medium has instructions that, when executed by processing circuitry, are configured to cause the processing circuitry to determine a force imparted on an input device of a ride vehicle of an attraction system, determine an orientation of a guest within the ride vehicle, and cause movement of the ride vehicle based on the force imparted on the input device and the orientation of the guest.

In an embodiment, an attraction system for an amusement park includes a ride vehicle with a chassis, a motion base coupled to the chassis, and an input device. The attraction system also includes a control system configured to determine a parameter value that includes a force imparted on the input device, a deformation of the input device, or both, and instruct the motion base to cause movement of the chassis of the ride vehicle of the attraction system based on the parameter value

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

The present disclosure is directed to an attraction system, such as a roller coaster, a dark ride, and/or an extended reality ride or experience, for an amusement or theme park. The attraction system may accommodate a guest and may include a variety of features to entertain the guest. For example, the attraction system may include a ride vehicle where a guest may be positioned (e.g., seated, secured). The ride vehicle may move during operation of the attraction system, thereby providing the guest with movement sensations to entertain the guest.

In order to improve the experience provided to different guests, the ride vehicle may be user-controllable. For example, the guest may control rotational and/or translational movement associated with the ride vehicle to adjust a position and/or an orientation of the ride vehicle. That is, instead of moving in a common or the same (e.g., a pre-programmed, preset) pattern, route, or direction for each ride cycle, the ride vehicle may move in a particular manner based on the control provided by the guest in the ride vehicle for a particular ride cycle. Such control may enable the guest to cause the ride vehicle to impart particular movement sensations that may be more desirable to the guest. Thus, the attraction system may provide a unique and interactive experience that may be more tailored to the guest.

Accordingly, embodiments of the present disclosure are directed to an input device with which a guest may interact to control movement of a ride vehicle of the attraction system. The input device may include a component on which the guest may impart forces, and a control system may determine the imparted forces and control movement of the ride vehicle based on the imparted forces. For example, the control system may cause the ride vehicle to translate, roll, and/or pitch based on a level or amount of a force being applied and/or based on a direction in which the force is applied. In an embodiment, the component may be fixedly or rigidly secured relative to the ride vehicle to provide certain benefits associated with implementation of the input device. As an example, the structural rigidity of the component may enable the user to control the forces being applied more acutely. For instance, limiting movement of the component may enable the user to apply and adjust fine amounts of the forces and facilitate more desirable movement of the ride vehicle based on such forces (e.g., fine tuning of applied force). Indeed, the finely adjusted forces being applied by the user may be representative of an intent of the user to move the ride vehicle, such as a target movement or motion and/or a target position or orientation of the ride vehicle. As another example, the limited movement of the component may also limit a physical footprint or space occupied by the input device, such as during actuation by a user. Thus, the area (e.g., an internal volume of the ride vehicle) surrounding the input device may be more efficiently utilized. As a further example, reducing relative movement between the component and a remainder of the input device may reduce wearing of the input device, such as that caused by friction or collision between different parts of the input device. As such, the lifespan of the input device may be increased to improve overall lifespan of associated equipment (e.g., the ride vehicle).

In an embodiment, the movement of the ride vehicle may also be controlled based on a position or posture of the guest within the ride vehicle. For example, the guest may equip a device, such as a headset, that may include a sensor. Movement of the guest may cause corresponding movement of the device and the sensor. In another embodiment, a camera system may detect features of a guest and identify relative movements based on changing positions of the detected features. Thus, the control system may determine the location and/or movement of the sensor or guest features to cause movement of the ride vehicle. In this manner, the control system may enhance control of the ride vehicle based on the positioning of the guest in addition to forces imparted on the input device. By way of example, the position of the guest (e.g., leaning in anticipation of forces applied by the intended movement of the ride vehicle) may further represent the intent of the guest to move the ride vehicle, and the control system may therefore provide an experience that may more closely align with a desirable movement of the ride vehicle and/or a desirable experience provided by the attraction system.

Figure 1:
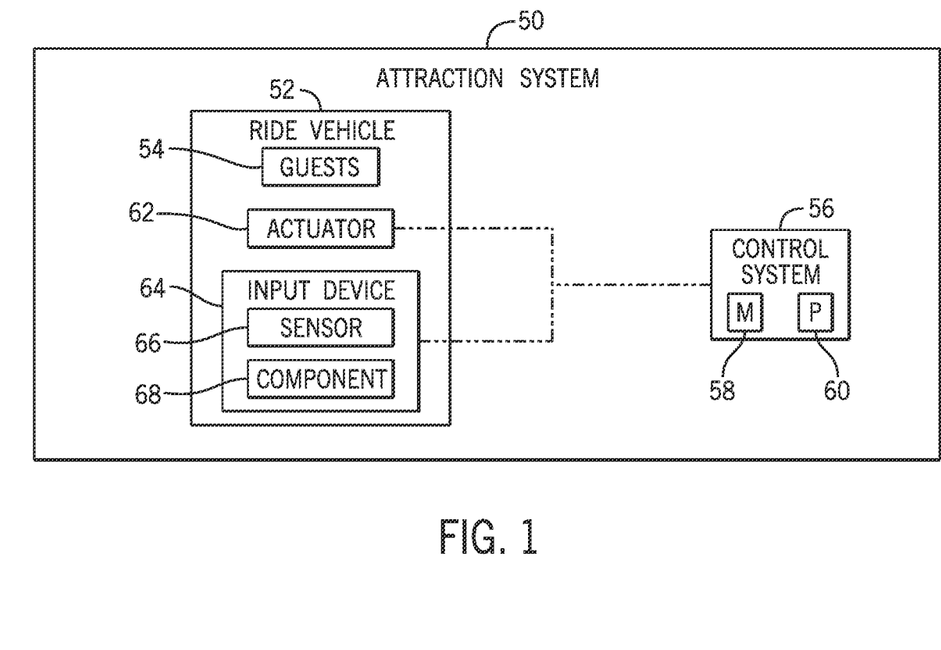
FIG. 1 is a schematic diagram of an embodiment of an attraction system, in accordance with an aspect of the present disclosure.

With the preceding in mind, FIG. 1 is a schematic diagram of an embodiment of an attraction system 50 of an amusement park. The attraction system 50 may include a ride vehicle 52, which may receive one or more guests 54 of the attraction system 50. For example, the guest(s) 54 may be secured within a seat of the ride vehicle 52. The ride vehicle 52 may move during operation of the attraction system 50. In an embodiment, the ride vehicle 52 may be mounted to a base (e.g., a motion base), which may be secured to a part (e.g., a floor, a ceiling, a wall) of the attraction system 50. The ride vehicle 52 may move relative to the base, such as to rotate and/or pivot about the base. In an additional or alternative embodiment, the attraction system 50 may include a track, and the ride vehicle 52 may move about the track, such as to translate along and/or rotate about the track. Movement of the ride vehicle 52 may impart movement sensations on the guest(s) 54, such as inertial forces, gravitational force equivalents (g-forces), postural adjustments, and so forth, to entertain the guest(s) 54.

The attraction system 50 may include or may be communicatively coupled to a control system 56 (e.g., an automation controller, an electronic controller) configured to control movement of the ride vehicle 52. The control system 56 may include a memory 58 and processing circuitry 60. The memory 58 may include volatile memory, such as random access memory (RAM), and/or non-volatile memory, such as read-only memory (ROM), optical drives, hard disc drives, solid-state drives, or any other non-transitory computer-readable medium that includes instructions to operate the attraction system 50, such as to control movement of the ride vehicle 52. The processing circuitry 60 may be configured to execute such instructions. For example, the processing circuitry 60 may include one or more application specific integrated circuits (ASICs), one or more field programmable gate arrays (FPGAs), one or more general purpose processors, or any combination thereof.

The ride vehicle 52 may include or may be coupled to an actuator 62 (e.g., a hydraulic actuator, an electromechanical actuator, a pneumatic actuator) configured to drive movement of the ride vehicle 52. As an example, the actuator 62 (e.g., a motor, a linear actuator) may be configured to rotate, pivot, and/or translate the ride vehicle 52. The control system 56 may be communicatively coupled to the actuator 62 and may cause the actuator 62 to drive movement of the ride vehicle 52. Thus, the control system 56 may control movement of the ride vehicle 52 via the actuator 62 in order to entertain the guest(s) 54. The actuator 62 illustrated in FIG. 1 may be representative of one or more actuators configured to manipulate one or more aspects of the ride vehicle 52.

In an embodiment, the ride vehicle 52 may be user-controllable. That is, for example, the guest(s) 54 positioned within the ride vehicle 52 may be able to control movement of the ride vehicle 52. To this end, the ride vehicle 52 may include an input device 64 that is accessible to the guest(s) 54. The guest(s) 54 may use the input device 64 to transmit a user input that causes movement of the ride vehicle 52. For example, the control system 56 may be communicatively coupled to the input device 64. The guest(s) 54 may interact with the input device 64, the control system 56 may determine the interaction between the guest(s) 54 and the input device 64, and the control system 56 may cause movement of the ride vehicle 52 based on the interaction. In one embodiment, the control system 56 may determine a parameter indicative of a force rather than movement or displacement imparted by the guest(s) 54 onto the input device 64. For this reason, the input device 64 may include a sensor 66 configured to monitor the parameter. As an example, the sensor 66 may include a force transducer (e.g., a load cell) configured to detect a physical force, such as pressure, compression, torque, tension, imparted on the input device 64, a strain gauge configured to detect strain or deformation of the input device 64 (e.g., caused by a physical force imparted on the input device 64), or any other suitable sensor 66 configured to monitor the parameter. The control system 56 may be communicatively coupled to the sensor 66, and the sensor 66 may be configured to transmit sensor data indicative of the monitored parameter to the control system 56. The control system 56 may receive the sensor data that includes the parameter and cause movement of the ride vehicle 52 based on the parameter. As an example, the guest(s) 54 may impart a force onto the input device 64, the sensor 66 may transmit sensor data indicative of the force to the control system 56, and the control system 56 may cause movement of the ride vehicle 52 based on the force, thereby causing movement of the ride vehicle 52 based on the interaction between the guest(s) 54 and the input device 64.

The control system 56 may be configured to cause movement of the ride vehicle 52 based on an amount, level, or intensity of the force being applied by the guest(s) 54 and/or based on directionality of the force being applied by the guest(s) 54. As an example, the control system 56 may cause the ride vehicle 52 to move more slowly in response to a smaller amount of force being applied, and the control system 56 may cause the ride vehicle 52 to move more quickly in response to a greater amount of force being applied. As another example, the control system 56 may cause the ride vehicle 52 to move in a first manner (e.g., in a first rotational direction, in a first translational direction) in response to force being applied in a first direction on the input device 64, and the control system 56 may cause the ride vehicle 52 to move in a second direction (e.g., in a second rotational direction, in a second translational direction) in response to force being applied in a second direction on the input device 64. Thus, the input device 64 may enable increased granularity with respect to the manner in which the ride vehicle 52 may be moved based on user interaction with the input device 64, and the user interaction does not include any substantial displacement of the input device 64.

In one embodiment, the input device 64 may include a physical component, feature, or part 68 with which the guest(s) 54 may physically interact to impart a force onto the input device 64. The physical component 68 may include, for example, a grip, a handle, and/or a rod that the guest(s) 54 may grasp to impart a force onto the input device 64. Indeed, the physical component 68 may have a size, a profile, a shape, and/or a geometry that may help the guest(s) 54 grasp and more readily or easily impart the desired force to cause movement of the ride vehicle 52. In an embodiment, the physical component 68 may be generally rigid, and movement of between the physical component 68 and the ride vehicle 52 may be limited. That is, the physical component 68 may be resilient or resistant to movement, such as relative to a remainder of the input device 64 and/or the ride vehicle 52, upon application of a force on the physical component 68. In other words, the physical component 68 may not substantially move (e.g., rotate, pivot, twist) from the force imparted by the guest(s) 54. As such, movement (e.g., rotation, pivoting, twisting) and/or positioning of the physical component 68 may not be indicative of an interaction between the guest(s) 54 and the input device 64, and the control system 56 therefore may not determine movement and/or positioning of the physical component 68 in order to cause movement of the ride vehicle 52. However, the physical component 68 may deform in response to a force imparted onto the input device 64. For example, the force may change a geometry, shape, volume, and/or surface area of the physical component 68. In this manner, while the physical component 68 may be rigid, the force may cause a portion of the physical component 68 to distort or deflect. Instructing the actuator 62 to drive movement of the ride vehicle 52 based on the physical force imparted onto the input device 64 may provide certain benefits that may not be easily achieved via causing movement of the ride vehicle 52 based on movement of the input device 64 (e.g., the physical component 68).

As an example, the force imparted by the guest(s) 54 onto the input device 64 may be more indicative of an intent of the guest(s) 54 to move the ride vehicle 52. Indeed, a rigid physical component 68 may enable the guest(s) 54 to provide greater acute control to drive movement of the ride vehicle 52. For instance, with respect to an input device having a physical component that is movable by the guest(s) 54, a change in orientation and/or position of the physical component (e.g., caused by a force imparted on the physical component) may correspondingly cause a change in the force imparted by the guest(s) 54, thereby further changing (e.g., inadvertently changing) the orientation and/or position of the physical component. In other words, it may be difficult for the guest(s) 54 to impart a desired amount of force on the physical component while the physical component is moving, such as to maintain a constant orientation and/or position of the physical component while the ride vehicle is being moved. However, the rigidity of the physical component 68 may enable the guest(s) 54 to control the amount of force being applied more easily, such as to maintain a target amount of force imparted on the physical component 68. Thus, the rigid physical component 68 may enable the guest(s) 54 to control movement of the ride vehicle 52 more acutely (e.g., based on more fine amounts of forces being imparted) and/or more accurately (e.g., more aligned with the intended or target movement of the ride vehicle 52) and block unintentional movement of the ride vehicle 52.

Additionally or alternatively, causing movement of the ride vehicle 52 based on the force imparted on the physical component 68 instead of a position of the physical component 68 may reduce a latency with respect to moving the ride vehicle 52. In other words, the ride vehicle 52 may be more readily moved based on the imparted force. By way of example, the guest(s) 54 may desire to adjust the ride vehicle 52 from a first orientation to a second orientation. For a movable physical component, the guest(s) 54 may adjust the movable physical component from a first position to a second position to cause movement of the ride vehicle 52 from the first orientation toward the second orientation. However, there may be a substantial distance (e.g., an angle of rotation, a linear distance) between the first position and the second position of the movable physical component. As such, during a block of time in which the movable physical component is adjusted from the first position to the second position, the ride vehicle 52 may not be adjusted from the first orientation to the second orientation. Thus, achieving the second orientation of the ride vehicle 52 may be delayed using the movable physical component. In contrast, in accordance with present embodiments, the guest(s) 54 may more readily and/or easily change the force being imparted on the rigid physical component 68. As an example, the guest(s) 54 may adjust an amount, level, or intensity of force being applied to the physical component 68 from a first amount to a second amount and/or adjust application of a force from a first direction to a second direction to cause movement of the ride vehicle 52 from the first orientation toward the second orientation. Adjustment of the force (e.g., adjustment of the amount and/or the directionality of the force) being applied to a rigid physical component 68 may be achieved more quickly than adjustment of a position of a movable physical component. Thus, the ride vehicle 52 may be more readily adjusted from the first orientation toward the second orientation (e.g., with less delay and/or latency) via the rigid physical component 68.

Furthermore, a rigid physical component 68 may have an increased lifespan as compared to that of a movable physical component. As an example, a movable physical component may include parts that collide, impact, and/or move against one another to cause wear during usage. As a result, maintenance may be performed to inspect, repair, and/or replace the movable physical component. For instance, operation of the attraction system 50 may be suspended in order to enable maintenance to be performed on the movable physical component, and the attraction system 50 may not entertain the guest(s) 54 while operation is suspended. A rigid physical component 68 may include fewer parts that collide, impact, and/or move against one another. Thus, the rigid physical component 68 may be associated with less wear and may have a prolonged lifespan. As a result, fewer maintenance operations may be performed on the physical component 68, and less suspended operation of the attraction system 50 may occur. As such, the rigid physical component 68 may enable more efficient operation of the attraction system 50 to entertain the guest(s) 54.

Further still, there may be a limited amount of physical space (e.g., an interior volume) associated with the ride vehicle 52. The input device 64 having a physical component 68 that does not substantially move may occupy a smaller physical footprint within the ride vehicle 52 as compared to another input device that may have a moving part or component. For example, a movable physical component may have an expected or possible range of motion in which other components (e.g., props) may not be positioned to avoid restricting movement of the movable physical component. However, the physical component 68 may have a limited range of motion, and the other components may therefore be positioned closer to the input device 64 (e.g., within a distance of the physical component 68 that would otherwise restrict movement of a movable physical component). In this manner, the input device 64 may enable more efficient usage of the physical space associated with the ride vehicle 52, such as to accommodate implementation of other components.

Figure 2:
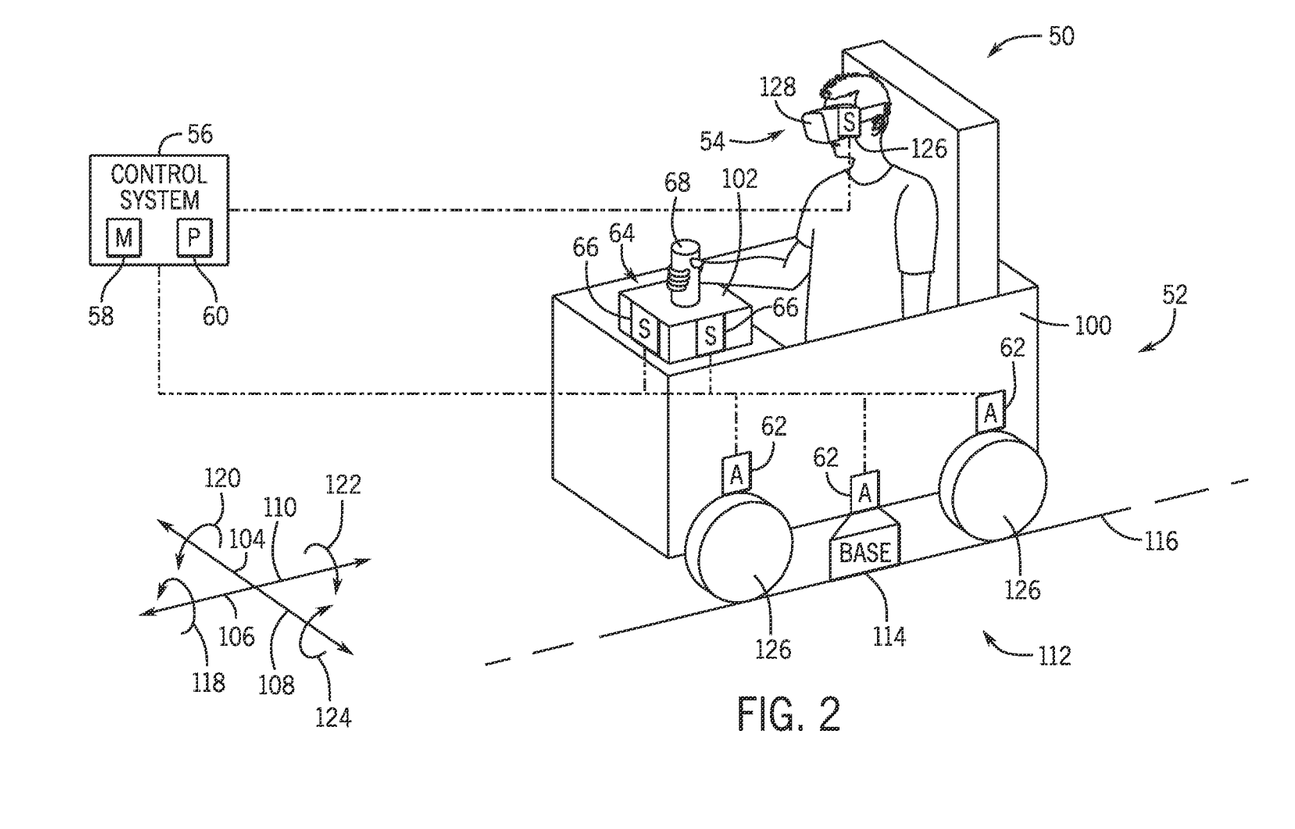
FIG. 2 is a perspective view of an embodiment of an attraction system with a user-controllable ride vehicle, in accordance with an aspect of the present disclosure.

FIG. 2 is a perspective view of an embodiment of the attraction system 50 that includes the ride vehicle 52. A guest 54 is positioned within the illustrated ride vehicle 52, such as within a chassis 100 of the ride vehicle 52. Additionally, the input device 64 may be positioned within the chassis 100 and may be accessible to the guest 54. For example, the input device 64 may include a support 102 that may be secured, attached, coupled, or otherwise fixedly coupled to the ride vehicle 52 (e.g., to a mount or wall of the ride vehicle 52), and the physical component 68 (e.g., an extension, a protrusion, a projection, a pad) may be fixedly coupled to (e.g., welded to, fastened to, integral with) the support 102. For example, the interface between the physical component 68 and the support 102 may restrict relative movement between the physical component 68 and the support 102. Thus, there may be limited relative movement between the physical component 68, the support 102, and the ride vehicle 52. The restricted movement between the physical component 68, the support 102, and the ride vehicle 52 may enable the guest 54 to impart a desirable force on the input device 64 (e.g., to maintain a relatively constant amount of force being applied). The physical component 68 may be shaped to enable the guest 54 to grasp or press down on the physical component 68 while positioned in the chassis 100, such as during operation of the attraction system 50, and facilitate application of a force onto the input device 64. For example, the guest 54 may impart a force onto the physical component 68 in a first direction 104 (e.g., a lateral direction), in a second direction 106 (e.g., a longitudinal direction, a direction perpendicular to the first direction 104), a third direction 108 opposite the first direction 104, a fourth direction 110 opposite the second direction 106, an intermediate direction between any of the directions 104, 106, 110, 108, and/or in any other suitable direction. Although the fixed coupling between the physical component 68 and the support 102 may limit relative movement between the physical component 68 and the support 102, the force imparted on the input device 64 may cause a change in shape of the physical component 68, the support 102, and/or another portion of the input device 64. The control system 56 may determine the imparted force and/or the change in shape (not substantial movement) to cause movement of the ride vehicle 52.

By way of example, the input device 64 may include the sensor(s) 66, which may be positioned at various sections or locations of the support 102 and/or the physical component 68. The sensor(s) 66 may determine an amount and/or a directionality of the force imparted by the guest 54 and may transmit sensor data indicative of the amount and/or the directionality of the force to the control system 56, and the control system 56 may cause movement of the ride vehicle 52 based on the sensor data. For instance, the sensor(s) 66 may transmit sensor data indicative of a force imparted on the physical component 68 and/or the support 102 (e.g., via the physical component 68), a deformation of the physical component 68 and/or the support 102 (e.g., deflection of the physical component 68, deformation of the interface or engagement between the physical component 68 and the support 102), or any other suitable parameter indicative of the force imparted on the input device 64. Indeed, although relative movement between the physical component 68 and the support 102 may be restricted and may not be substantial, the force imparted on the input device 64 may cause the physical component 68 and/or the support 102 to deform or change in shape, such as to lengthen and/or shorten within 100 micrometers per meter. For instance, the force may change the shape of the physical component 68 and/or of the support 102 (e.g., relative to a default, baseline, or reference shape of the component 68 and/or of the support 102), and the sensor data may be indicative of the change in shape of the physical component 68 and/or of the support 102. The control system 56 may cause movement of the ride vehicle 52 based on the sensor data.

In an embodiment, the ride vehicle 52 may include a motion base 112, which may include a base 114 secured to a track, path, or floor 116 as well as the actuator 62 that may couple the chassis 100 of the ride vehicle 52 to the base 114. For example, the motion base 112 may include a parallel manipulator (e.g., a Stewart platform) in which the base 114 may include a plate and the actuator 62 may include multiple linear actuators coupled to the base 114 and the chassis 100 and configured to move various parts of the chassis 100 relative to the base 114. The control system 56 may utilize the motion base 112 to cause the chassis 100 to pivot about the fixed base 114. For example, in response to receipt of sensor data indicative of the guest 54 imparting a force on the physical component 68 in the first direction 104, the control system 56 may instruct the actuator 62 to rotate the chassis 100 (e.g., roll) in a first rotational direction 118 about the base 114. In response to receipt of sensor data indicative of the guest 54 imparting a force on the physical component 68 in the second direction 106, the control system 56 may instruct the actuator 62 to rotate the chassis 100 (e.g., pitch) in a second rotational direction 120 about the base 114. In response to receipt of sensor data indicative of the guest 54 imparting a force on the physical component 68 in the third direction 108, the control system 56 may instruct the actuator 62 to rotate the chassis 100 (e.g., roll) in a third rotational direction 122, opposite the first rotational direction 118, about the base 114. In response to receipt of sensor data indicative of the guest 54 imparting a force on the physical component 68 in the fourth direction 110, the control system 56 may instruct the actuator 62 to rotate the chassis 100 (e.g., pitch) in a fourth rotational direction 124, opposite the second rotational direction 128, about the base 114.

In an additional or alternative embodiment, the ride vehicle 52 may include one or more wheels, tracks, and/or rollers 126 configured to rotate in order to drive translational or linear movement of the ride vehicle 52 (e.g., the chassis 100) along the track 116. As an example, each wheel 126 may be drivable via the actuator 62 (e.g., a respective actuator 62), and the control system 56 may cause the actuator 62 to drive the wheel 126 to rotate and move the ride vehicle 52. For instance, in response to receipt of sensor data indicative of the guest 54 imparting a force on the physical component 68 in the second direction 106, the control system 56 may instruct the actuator 62 to rotate the wheel(s) 126 to move the ride vehicle 52 in the second direction 106. In response to receipt of sensor data indicative of the guest 54 imparting a force on the physical component 68 in the fourth direction 110, the control system 56 may instruct the actuator 62 to rotate the wheel(s) 126 to move the ride vehicle 52 in the fourth direction 110. Additionally or alternatively, the wheel(s) 126 may be configured to rotate in a manner to drive the ride vehicle 52 to move in the first direction 104 and/or in the third direction 108. In such an embodiment, in response to receipt of sensor data indicative of the guest 54 imparting a force on the physical component 68 in the first direction 104, the control system 56 may instruct the actuator 62 to rotate the wheel(s) 126 to move the ride vehicle 52 in the first direction 104. Further, in response to receipt of sensor data indicative of the guest 54 imparting a force on the physical component 68 in the third direction 108, the control system 56 may instruct the actuator 62 to rotate the wheel(s) 126 to move the ride vehicle 52 in the third direction 108.

As discussed herein, a speed, acceleration, and/or rate in which the ride vehicle 52 moves may be based on the force (e.g., an amount, level, or intensity of the force) being applied to the input device 64. In an embodiment, the control system 56 may cause the ride vehicle 52 to move more slowly in response to receipt of sensor data indicative of a smaller force being applied to the physical component 68, and the control system 56 may cause the ride vehicle 52 to move more quickly in response to receipt of sensor data indicative of a greater force being applied to the physical component 68. As an example, in response to receipt of sensor data indicative of a smaller force being applied to the physical component 68 in the second direction 106, the control system 56 may instruct the actuator 62 to rotate the ride vehicle 52 more slowly about the base 114 to cause the ride vehicle 52 to move more slowly in the second rotational direction 120. In response to receipt of sensor data indicative of a greater force being applied to the physical component 68 in the second direction 106, the control system 56 may instruct the actuator 62 to rotate the ride vehicle 52 more quickly about the base 114 to cause the ride vehicle 52 to move more quickly in the second rotational direction. As another example, in response to receipt of sensor data indicative of a smaller force being applied to the physical component 68 in the second direction 106, the control system 56 may instruct the actuator 62 to rotate the wheel(s) 126 more slowly to cause the ride vehicle 52 to move more slowly along the second direction 106. In response to receipt of sensor data indicative of a greater force being applied to the physical component 68 in the second direction 106, the control system 56 may instruct the actuator 62 to rotate the wheel(s) 126 more quickly to cause the ride vehicle 52 to move more quickly along the second direction 106. As such, the guest 54 may have greater control regarding the manner in which the ride vehicle 52 moves via force input.

To this end, the control system 56 may map or associate a particular force parameter (e.g., an amount of force, a direction of force) with a movement parameter (e.g., a direction, a speed, an acceleration) of the ride vehicle 52 to cause the corresponding movement of the ride vehicle 52 based on an applied force. That is, in response to receipt of a force parameter, the control system 56 may cause movement of the ride vehicle 52 in accordance with the movement parameter associated with the force parameter. In an embodiment, the control system 56 may have different associations between force parameters and corresponding movement parameters. By way of example, different guests 54 may be able to or may prefer to apply different amounts of force to move the ride vehicle 52 in a particular manner. For instance, a first guest 54 may output a relatively large amount of force on the physical component 68 to control movement of the ride vehicle 52, and a second guest 54 may output a relatively small amount of force on the physical component 68 to control movement of the ride vehicle 52. Thus, the control system 56 may adjust the association between force parameters and corresponding movement parameters to enable the movement of the ride vehicle 52 to be more suitably controlled by the particular guest 54. In other words, for different guests 54, the same movement parameter (e.g., movement of the ride vehicle 52 in a particular direction and/or at a particular speed) may be associated with a different force parameter to accommodate the different levels of force that each guest 54 may apply. For instance, in the example above, the first guest 54 may output a larger force than that output by the second guest 54 to cause the same type and/or degree of movement of the ride vehicle 52.

In one embodiment, the control system 56 may operate the attraction system 50 in a calibration mode to determine an appropriate association between force parameters and respective corresponding movement parameters prior to operating the attraction system 50 (e.g., in an entertainment mode) that enables control of the movement of the ride vehicle 52 based on the force applied by the guest 54. For example, during the calibration mode, the control system 56 may determine an upper threshold value (e.g., a maximum level, an upper limit amount) of a force applied by the guest 54 in a particular direction, and the control system 56 may associate the upper threshold value of the force with a corresponding upper threshold value (e.g., a maximum level, an upper limit amount) of a movement (e.g., a speed, an acceleration) of the ride vehicle 52. The control system 56 may then associate various values of forces that are below the upper threshold value with respective corresponding values of movement of the ride vehicle 52. As an example, the control system 56 may associate a value of the force that is a particular percentage (e.g., 50 percent) of the upper threshold value of the force to a value of the movement that is a corresponding percentage (e.g., 50 percent) of the upper threshold value of the movement of the ride vehicle 52. As such, the control system 56 may associate multiple different values of forces with respective corresponding values of movements of the ride vehicle 52 based on the upper threshold value of the force corresponding to the upper threshold value of the movement of the ride vehicle 52. For example, the upper threshold value of the movement of the ride vehicle 52 may be the same for each guest 54, but each guest 54 may apply a different upper threshold value of force. Thus, a different upper threshold value of force may correspond to the same upper threshold value of movement of the ride vehicle 52 for different guests 54. As a result, the control system 56 may associate different values of forces to the same value of movement of the ride vehicle 52 for different guests 54. Accordingly, different guests 54 may apply a different force to cause the same movement of the ride vehicle 52, and/or the same force applied by different guests 54 may cause different movements of the ride vehicle 52.

In an embodiment, the association between force parameters and respective corresponding movement parameters may be stored (e.g., on the memory 58) and associated with a particular guest 54, such as via a guest profile. The association may therefore be retrieved, such as based on an identification of the guest 54 and the corresponding guest profile, at any time after performance of the calibration mode (e.g., for different operations in the entertainment mode). For example, a particular association may be retrieved each time a determination is made that the corresponding guest 54 is in the ride vehicle 52 (e.g., based on a user input, based on face recognition). Thus, instead of performing the calibration mode multiple times for the same guest 54, the association may be automatically implemented (e.g., the attraction system 50 may operate in the entertainment mode without initially operating in the calibration mode), thereby increasing efficient operation of the attraction system 50 for the guest 54.

Although the input device 64 may primarily be used to control certain movements of the ride vehicle 52 via force imparted on the physical component 68, in an additional or alternative embodiment, the input device 64 may include other features to drive movement of the ride vehicle 52 and/or may be used to control other aspects of the attraction system 50. In an example, the control system 56 may utilize the force imparted on the input device 64 to cause additional movement of the ride vehicle 52, such as to cause the chassis 100 to yaw about the base 114, to move the ride vehicle 52 along a vertical axis, and so forth. In another example, the input device 64 may additionally include a movable component, such as a button, a switch, a dial, and the like, with which the guest 54 may interact to cause certain movement of the ride vehicle 52. In a further example, the input device 64 may be used to control another component of the attraction system 50, such as another movable component that the guest 54 is not positioned within and/or a component configured to provide show effects, such as a visual output (e.g., lighting, a video), an audio output (e.g., sound), and the like. For instance, the control system 56 may be configured to control the other component based on the determined force imparted on the physical component 68 and/or based on actuation of a movable component of the input device 64 via the guest 54.

In an embodiment, the control system 56 may also determine an orientation, position, and/or posture of the guest 54 and control movement of the ride vehicle 52 based on the orientation of the guest 54. As an example, the control system 56 may be communicatively coupled to another sensor 128 that may transmit sensor data indicative of the orientation of the guest 54. In the illustrated embodiment, the sensor 128 is attached to a device 130, such as a headset, that may be equipped by the guest 54. Thus, movement of the guest 54 (e.g., a head of the guest 54) may cause corresponding movement of the sensor 128, and the control system 56 may determine the movement and/or position of the sensor 128 to determine the orientation of the guest 54. For instance, the sensor 128 may include a gyroscope and/or an accelerometer, and the sensor 128 may transmit sensor data indicative of the movement of the sensor 128 to the control system 56. Additionally or alternatively, the sensor 128 may include another component, such as a light detection and ranging (LIDAR) sensor and/or a proximity sensor, that may transmit sensor data indicative of the orientation of the guest 54 without being physically moved, such as by performing a visual scan or capture of the ride vehicle 52 in which the guest 54 is positioned.

The control system 56 may control a direction associated with the movement of the ride vehicle 52 based on the orientation of the guest 54. As an example, the control system 56 may determine that the guest 54 may be leaning or tilting in a particular direction and may cause corresponding movement, such as rotation (e.g., roll) and/or translation, of the ride vehicle 52. The control system 56 may additionally or alternatively control a speed, an acceleration, and/or a rate associated with the movement of the ride vehicle 52 based on the particular orientation of the guest 54. For instance, in response to determining a first orientation and/or a first change in orientation (e.g., a smaller degree of leaning) of the guest 54, the control system 56 may cause a first movement (e.g., slower movement) of the ride vehicle 52. In response to determining a second orientation and/or a second change in orientation (e.g., a greater degree of leaning) of the guest 54, the control system 56 may cause a second movement (e.g., faster movement) of the ride vehicle 52. Thus, the control system 56 may also control granularity of the manner in which the ride vehicle 52 moves based on the orientation of the guest 54.

The control system 56 may also utilize the orientation of the guest 54 to verify and/or supplement movement control of the ride vehicle 52 based on an applied force. In one example, the control system 56 may determine a force applied by the guest 54 (e.g., a force being applied in the first direction 104) on the input device 64, but the control system 56 may not cause the ride vehicle 52 to move until an appropriate orientation of the guest 54 (e.g., tilt or leaning of the guest 54 toward the first direction 104 is above a threshold number of degrees) corresponding to the applied force has been identified. Thus, the control system 56 may block unintended movement of the ride vehicle 52 caused by an inadvertent force being applied on the input device 64 (e.g., a gravitational force, accidental contact of the input device 64). In another example, the control system 56 may cause additional movement of the ride vehicle 52 based on both the force applied by the guest 54 on the input device 64 and the orientation of the guest 54. For instance, the control system 56 may determine a change in the orientation of the guest 54 (e.g., to tilt or lean toward the first direction 104) and may cause movement of the ride vehicle 52 based on the determined change in the orientation of the guest 54 prior to determination of a force being applied to the input device 64. Subsequently, the control system 56 may determine a force being applied to the input device 64 and may cause additional movement of the ride vehicle 52 based on the applied force. By way of example, the guest 54, in anticipation of the movement of the ride vehicle 52, may begin to move and change orientation prior to applying a force on the input device 64. Thus, the orientation and/or change of orientation of the guest 54 may further indicate the intent of the guest 54 to move the ride vehicle 52 in a particular manner, and the control system 56 may more readily cause the intended movement of the ride vehicle 52.

The control system 56 may further utilize the force imparted on the input device 64 and the orientation of the guest 54 to control respective aspects of movement of the ride vehicle 52. As an example, the control system 56 may move the ride vehicle 52 in a direction based on the orientation of the guest 54 and not based on the force imparted on the input device 64. That is, the control system 56 may move the ride vehicle 52 in a direction based on the orientation of the guest 54 regardless of the force imparted on the input device 64. As another example, the control system 56 may move the ride vehicle 52 at a speed and/or acceleration based on the force imparted on the input device and not based on the orientation of the guest 54. Thus, the control system 56 may move the ride vehicle 52 at a speed and/or acceleration based on the force imparted on the input device 64 regardless of the orientation of the guest 54. Additionally or alternatively, the control system 56 may move the ride vehicle 52 in a direction based on the force imparted on the input device 64 and at a speed and/or acceleration based on the orientation of the guest 54. Indeed, the control system 56 may utilize the force imparted on the input device 64 and the orientation of the guest 54 to cause any suitable movement of the ride vehicle 52.

In an embodiment, the control system 56 may also utilize the orientation of the guest 54 to determine the association between force parameters and respective corresponding movement parameters, such as in addition to or as an alternative to the upper threshold value of the force being applied during the calibration mode. As an example, the orientation of the guest 54 may indicate a physical parameter, such as a profile, a size, and/or a dimension associated with the guest 54. For instance, the position of the sensor 128 may indicate a location where the device 130 is equipped by the guest 54, and the location where the device 130 is equipped by the guest 54 may indicate the physical parameter associated with the guest 54. As another example, the change in orientation of the guest 54 caused by movement of the ride vehicle 52 (e.g., inertia) may indicate a strength or force output capability associated with the guest 54. The control system 56 may predict an upper threshold value of the force output by the guest 54 based on the orientation of the guest 54, and the control system 56 may then associate various values of forces to respective corresponding values of movement of the ride vehicle 52 based on the predicted upper threshold value of the force output by the guest 54. Indeed, the control system 56 may generate, adjust, or otherwise update the association between the force parameters and the respective corresponding movement parameters based on the determined orientation of the guest 54.

Each of FIGS. 3 and 4 described below illustrates an embodiment of a method or process for operating an attraction system (e.g., the attraction system 50). Any suitable device or component (e.g., the processing circuitry 60 of the control system 56) may perform the methods. For example, the same device or a different device may perform the respective methods. In one embodiment, each method may be implemented by executing instructions stored in a tangible, non-transitory, computer-readable medium (e.g., the memory 58 of the control system 56). For instance, each method may be performed at least in part by one or more software components, one or more software applications, and the like. While each method is described using steps in a specific sequence, additional steps may be performed, the described steps may be performed in different sequences than the sequence illustrated, and/or certain described steps may be skipped or not performed altogether.

Figure 3:
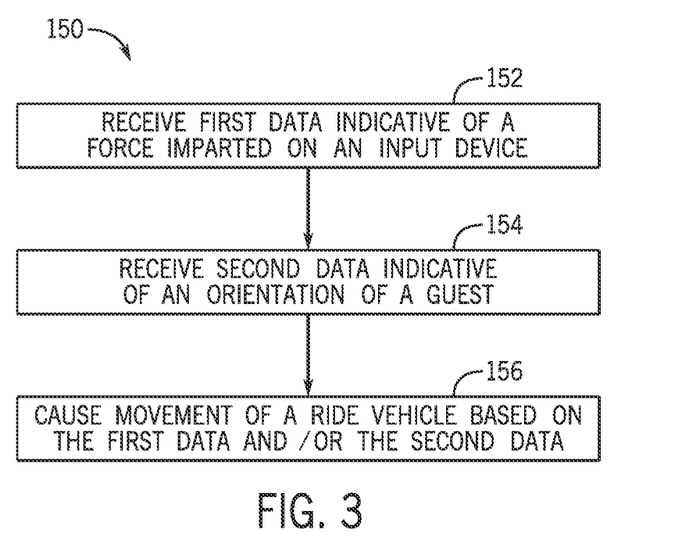
FIG. 3 is a block diagram of a method or process for operating an attraction system, in accordance with an aspect of the present disclosure.

FIG. 3 is a block diagram of an embodiment of a method or process 150 for operating the attraction system in an entertainment mode to entertain one or more guests positioned within a ride vehicle. At block 152, first data indicative of a force imparted on an input device (e.g., a support, an extension, a protrusion, a projection of the input device) may be received. For example, the first data may include a value of a force (e.g., an amount of force, a directionality of force) imparted on the input device and/or a value of a deformation caused by the force imparted on the input device. The first data may be received via sensor data transmitted by a sensor, such as a force transducer and/or a strain gauge.

At block 154, second data indicative of an orientation, positioning, and/or posture of a guest is received. By way of example, the second data may include a parameter value indicative of the orientation of the guest. For instance, the parameter value may include a position of a portion of the guest (e.g., the guest's head). In an embodiment, the second data may include a position of a sensor that is attached to a device configured to be equipped by the guest. Thus, the movement of the guest may cause movement of the device and therefore corresponding movement of the sensor to adjust the position of the sensor. Additionally or alternatively, the second data may include an image or visualization of the guest, such as with respect to the ride vehicle and/or within the attraction system.

At block 156, the ride vehicle may be moved based on the first data and/or the second data. By way of example, an actuator may be instructed based on the first data (e.g., a force applied to a joystick) and/or the second data (e.g., a position of a portion of a guest as detected by a sensor) to drive movement of the ride vehicle. Certain weighting criteria may be applied to each type of data and combined to provide a single output. For example, force applied to the joystick may be the primary (more heavily weighted) input, but the force input may be modified by data related to body position of the guest controlling the input device. Thus, these two inputs may be combined to activate an actuator in a particular manner. In an embodiment, the actuator may cause the ride vehicle to rotate or pivot, such as about a base. In an additional or alternative embodiment, the actuator may cause the ride vehicle to translate, such as along a track or path.

In one embodiment, a particular movement parameter of the ride vehicle may be based on the first data and/or the second data. The movement parameter may include, for instance, a position (e.g., a target position), a speed, and/or an acceleration of the ride vehicle. As an example, the ride vehicle may be moved at a reduced speed, a reduced acceleration, or both based on first data indicative of a smaller force (e.g., a smaller force value, a smaller strain value) imparted on the input device, and the ride vehicle may be moved at an increased speed, an increased acceleration, or both based on first data indicative of a greater force (e.g., a greater force value, a greater strain value) imparted on the input device. As another example, a difference (e.g., a distance difference, an angle difference) between the position of the guest indicated by the second data and a reference position indicative of a base or default orientation of the guest (e.g., an orientation of the guest while the ride vehicle is not moving and/or is at an initial, base, or starting orientation) may be determined. The ride vehicle may be moved at a reduced speed, a reduced acceleration, or both based on second data indicative of a smaller difference between the position and the reference position (e.g., a smaller distance differential, a smaller angle differential), and the ride vehicle may be moved at an increased speed, an increased acceleration, or both based on second data indicative a greater difference between the position and the reference position (e.g., a greater distance differential, a greater angle differential).

In an additional or alternative embodiment, movement of the ride vehicle may be based on whether each of the force indicated by the first data and the orientation indicated by the second data are received. In an example, the ride vehicle may be moved at a reduced speed, a reduced acceleration, or both in response to determining that the orientation of the guest is different from the reference position based on the second data and in response to determining that no force is imparted on the input device based on the first data. In another example, the ride vehicle may be moved at a reduced speed, a reduced acceleration, or both in response to determining a force is being imparted on the input device based on the first data and in response to determining that the guest is oriented at the reference position based on the second data. However, the ride vehicle may be moved at an increased speed, an increased acceleration, or both in response to determining that a force is being imparted on the input device based on the first data and in response to determining that the guest is not oriented at the reference position based on the second data.

In a further example, movement of the ride vehicle may be blocked in response to determining that the guest is oriented at the reference position (e.g., based on the distance differential and/or the angle differential being below a threshold value), even though a force may be imparted on the input device. However, the ride vehicle may be moved, such as based on the force imparted on the input device, in response to determining that the guest is no longer oriented at the reference position (e.g., based on the distance differential and/or the angle differential exceeding the threshold value). That is, movement of the ride vehicle may be blocked regardless of the force imparted on the input device until the position of the guest is sufficiently different from the reference position. Additionally or alternatively, movement of the ride vehicle may be blocked regardless of the orientation of the guest until the force imparted on the input device is above a threshold value. In this manner, the ride vehicle may be moved, such as based on the force imparted on the input device, in response to determining that the force imparted on the input device is above the threshold value. As such, the first data and the second data may be cooperatively used for causing movement of the ride vehicle.

In an embodiment, the force indicated by the first data and the orientation indicated by the second data may be used to control respective aspects of movement of the ride vehicle. As an example, the direction in which the ride vehicle moves may be based on the orientation (e.g., the ride vehicle may be moved in the same direction in which the guest leans), and the speed and/or acceleration in which the ride vehicle moves may be based on the force (e.g., an intensity of the force) imparted on the input device. In this embodiment, for example, the direction in which the ride vehicle moves may not be based on the force (e.g., a direction of the force) imparted on the input device. Similarly, the speed and/or acceleration in which the ride vehicle moves may not be based on the orientation (e.g., an amount of leaning) of the guest. Additionally or alternatively, the direction in which the ride vehicle moves may be based on the force (e.g., a direction of the force) imparted on the input device, and the speed and/or acceleration in which the ride vehicle moves may be based on the orientation of the guest. Thus, the first data and the second data may be used to control different manners in which the ride vehicle may be moved.

Figure 4:
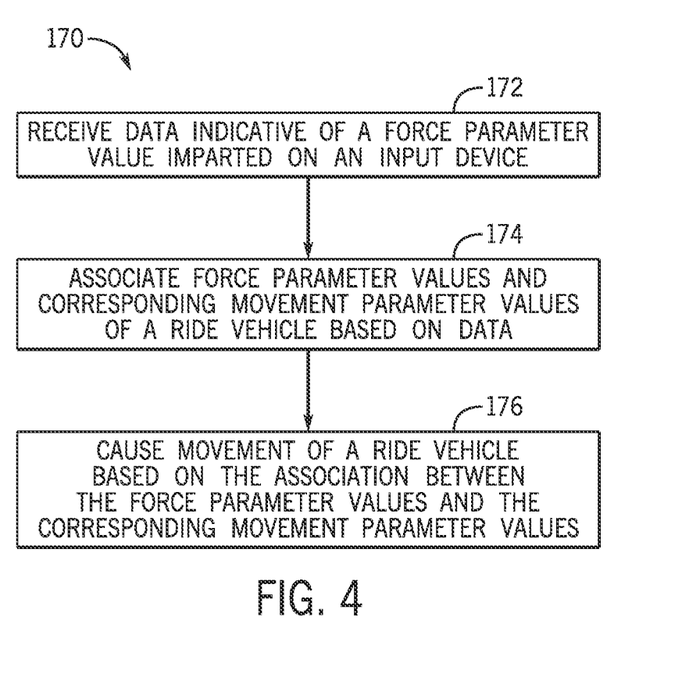
FIG. 4 is a block diagram of a method or process for calibrating an input device for operating a ride vehicle of an attraction system.

FIG. 4 is a block diagram of a method or process 170 for operating the attraction system in a calibration mode to determine the manner in which the ride vehicle is moved based on an indication (e.g., via the first data) of a force imparted on the input device during operation in the entertainment mode. By way of example, the method 170 may be performed prior to operation of the attraction system in the entertainment mode. For instance, movement of the ride vehicle may be blocked during performance of the method 170. The method 170 may be performed to enable operation of the attraction system in the entertainment mode more appropriately or suitably for a specific guest, such as to accommodate a comfort or ability associated with various forces being applied by the guest.

At block 172, data indicative of a force parameter value imparted on an input device may be received. The force parameter value may include a force value (e.g., an amount, level, or intensity of force) and/or a deformation value (e.g., of the input device). In an embodiment, the force parameter value may be associated with an upper threshold force parameter value applied by the guest on the input device. For instance, the attraction system may instruct the guest to apply a maximum desired force (e.g., a maximum force that the guest may desire to output to control movement of the ride vehicle during operation of the attraction system in the entertainment mode), and the force parameter value associated with the maximum desired force applied by the guest may be determined in response.

At block 174, various force parameter values may be associated with corresponding movement parameter values, such as position values, speed values, and/or acceleration values, of the ride vehicle based on the data. As an example, the upper threshold force parameter value may be associated with an upper threshold movement parameter value (e.g., an upper limit of the position, speed, and/or acceleration to which the ride vehicle may move during operation of the attraction system in the entertainment mode), and different force parameter values below the upper threshold force parameter value may be associated with corresponding movement parameter values below the upper threshold movement parameter value. For instance, a force parameter value that is a specific percentage of the upper threshold force parameter value may be associated with a movement parameter value that is approximately the same specific percentage of the upper threshold movement value. Additionally or alternatively, the force parameter value may be associated with a corresponding movement value in any other suitable manner, such as based on another relationship between the force parameter value and the upper threshold force parameter value and/or another relationship between the movement value and the upper threshold movement value.

At block 176, movement of the ride vehicle may be caused based on the association between the force parameter values and the corresponding movement parameter values. For example, data indicative of a force imparted on an input device and including a force parameter value may be received. In response, a corresponding movement parameter value associated with the force parameter value may be determined. The ride vehicle may then be moved in accordance with the corresponding movement parameter value.

The association between the force parameter values and corresponding movement parameter values may be stored and retrieved at a later time. For example, the association may be connected to a particular guest (e.g., a guest identification) and, in response to determining that the particular guest is in the ride vehicle, the association may be retrieved and implemented (e.g., without having to re-perform the calibration mode). Thus, after the calibration mode has been performed to generate the association between the force parameter values and corresponding movement parameter values, the association may be readily available for retrieval and implementation at a different time.

Furthermore, although the method 170 is primarily directed to generating the association between force parameter values and corresponding movement parameter values, a similar calibration method may be performed to generate an association between orientation parameter values associated with the guest and corresponding movement parameter values. For example, the association between the orientation parameter values and the corresponding movement parameter values may be implemented to adjust how the movement of the ride vehicle may be controlled based on the determined orientation of the guest during the operation of the attraction system in the entertainment mode.

While only certain features of the disclosed embodiments have been illustrated and described herein, many modifications and changes will occur to those skilled in the art. It is, therefore, to be understood that the appended claims are intended to cover all such modifications and changes as fall within the true spirit of the disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. An amusement park attraction system, comprising:
a ride vehicle comprising an input device;
one or more sensors configured to detect an orientation of a guest; and
a control system configured to perform operations comprising:
determining the orientation of the guest positioned within the ride vehicle based on sensor data received from the one or more sensors at a first time;
controlling movement of the ride vehicle of the amusement park attraction system based on the orientation of the guest at the first time;
determining a parameter value associated with a force imparted on the input device at a second time after the first time, wherein the parameter value comprises a value of the force imparted on the input device, a value of a deformation caused by the force imparted on the input device, or both; and
controlling additional movement of the ride vehicle of the amusement park attraction system based on the parameter value at the second time.

2. The amusement park attraction system of claim 1, wherein the input device comprises a support and an extension coupled to the support, and the parameter value comprises a value of a force imparted on the extension, a value of a deformation of the extension, or both.

3. The amusement park attraction system of claim 2, wherein the ride vehicle comprises a chassis, the support is fixedly coupled to the chassis, and the extension is fixedly coupled to the support.

4. The amusement park attraction system of claim 1, comprising an actuator, wherein the control system is configured to cause the actuator to drive movement of the ride vehicle based on the parameter value associated with the force imparted on the input device.

5. The amusement park attraction system of claim 4, wherein the actuator is configured to cause the ride vehicle to pivot about a base, translate along a track of the amusement park attraction system, or both.

6. The amusement park attraction system of claim 1, wherein the control system is configured to perform operations comprising:
receiving data indicative of an upper threshold parameter value associated with the force imparted on the input device;
associating the upper threshold parameter value with an upper threshold movement value of the ride vehicle;
associating a plurality of parameter values with a plurality of corresponding movement parameter values of the ride vehicle based on the data, wherein the plurality of parameter values comprises the parameter value associated with the force imparted on the input device;
determining a corresponding movement parameter value of the plurality of corresponding movement parameter values in response to determining the parameter value associated with the force imparted on the input device; and
controlling the movement of the ride vehicle in accordance with the corresponding movement parameter value.

7. The amusement park attraction system of claim 1, wherein the control system is configured to control a direction, a speed, an acceleration, or any combination thereof associated with the movement of the ride vehicle based on the parameter value associated with the force imparted on the input device.

8. The amusement park attraction system of claim 1, wherein the control system is configured to perform operations comprising determining a difference between the orientation of the guest and a default orientation of the guest.

9. The amusement park attraction system of claim 8, wherein the control system is configured to perform operations comprising reducing a movement speed of the ride vehicle, an acceleration of the ride vehicle, or both based on the difference between the orientation of the guest and the default orientation of the guest.

10. A non-transitory computer-readable medium, comprising instructions that, when executed by processing circuitry, are configured to cause the processing circuitry to perform operations comprising:
- determining an orientation of a guest within a ride vehicle of an attraction system based on a position of a first sensor of the attraction system at a first time;
- causing movement of the ride vehicle based on the orientation of the guest at the first time;
- determining a force imparted on an input device of the ride vehicle of the attraction system at a second time after the first time; and
- causing additional movement of the ride vehicle based on the force imparted on the input device at the second time.

11. The non-transitory computer-readable medium of claim 10, wherein the instructions, when executed by the processing circuitry, are configured to cause the processing circuitry to determine the force imparted on the input device based on sensor data received via a second sensor, and the sensor data is indicative of a force value, a deformation value, or both associated with the force imparted on the input device.

12. The non-transitory computer-readable medium of claim 10, wherein the instructions, when executed by the processing circuitry, are configured to cause the processing circuitry to perform operations comprising:
- causing movement of the ride vehicle at a first speed, a first acceleration, or both in response to determining the orientation of the guest within the ride vehicle; and
- causing movement of the ride vehicle at a second speed, a second acceleration, or both in response to determining the orientation of the guest within the ride vehicle and the force imparted on the input device, wherein the second speed is greater than the first speed, the second acceleration is greater than the first acceleration, or both.

13. The non-transitory computer-readable medium of claim 10, wherein the instructions, when executed by the processing circuitry, are configured to cause the processing circuitry to perform operations comprising:
- causing the movement of the ride vehicle in response to determining the force imparted on the input device and determining that a parameter value associated with the orientation of the guest within the ride vehicle is greater than a threshold value; and
- blocking the movement of the ride vehicle in response to determining the force imparted on the input device and determining that the parameter value associated with the orientation of the guest within the ride vehicle is less than the threshold value.

14. The non-transitory computer-readable medium of claim 10, wherein the instructions, when executed by the processing circuitry, are configured to cause the processing circuitry to perform operations comprising:
- causing the ride vehicle to move at a first speed, a first acceleration, or both based on a first force imparted on the input device; and
- causing the ride vehicle to move at a second speed, a second acceleration, or both based on a second force imparted on the input device, wherein the second speed is greater than the first speed, the second acceleration is greater than the first acceleration, or both based on the second force being greater than the first force.

15. The non-transitory computer-readable medium of claim 10, wherein the instructions, when executed by the processing circuitry, are configured to cause the processing circuitry to perform operations comprising:
- causing the ride vehicle to move at a first speed, a first acceleration, or both based on a first orientation of the guest, wherein the first orientation comprises a first distance differential from a reference position, a first angle differential from the reference position, or both; and
- causing the ride vehicle to move at a second speed, a second acceleration, or both based on a second orientation of the guest, wherein the second orientation comprises a second distance differential from the reference position, a second angle differential from the reference position, or both, and the second speed is greater than the first speed, the second acceleration is greater than the first acceleration, or both based on the second distance differential being greater than the first distance differential, the second angle differential being greater than the first angle differential, or both.

16. The non-transitory computer-readable medium of claim 10, wherein the instructions, when executed by the processing circuitry, are configured to cause the processing circuitry to instruct an actuator of the ride vehicle based on the force imparted on the input device and the orientation of the guest to cause the movement of the ride vehicle.

17. An attraction system for an amusement park, the attraction system comprising:
- a ride vehicle comprising a chassis, a motion base coupled to the chassis, and an input device;
- a first sensor configured to detect an orientation of a guest; and
- a control system configured to perform operations comprising:
  - determining the orientation of the guest based on sensor data received from the first sensor at a first time;
  - instructing the motion base to cause movement of the chassis of the ride vehicle of the attraction system based on the orientation of the guest at the first time;
  - determining a parameter value comprising a force imparted on the input device, a deformation of the input device, or both at a second time after the first time; and
  - instructing the motion base to cause additional movement of the chassis of the ride vehicle of the attraction system based on the parameter value at the second time.

18. The attraction system of claim 17, wherein the motion base comprises a base and an actuator coupled to the base, wherein the control system is configured to cause the actuator to move the chassis about the base based on the parameter value.

19. The attraction system of claim 18, wherein the control system is configured to instruct the actuator to cause the chassis to pitch, roll, or both about the base based on the parameter value.

20. The attraction system of claim 17, comprising a second sensor communicatively coupled to the control system, wherein the second sensor is configured to output sensor data indicative of the parameter value to the control system, and the second sensor comprises a force transducer, a strain gauge, or both.

* * * * *